United States Patent [19]

van Thiel

[11] Patent Number: 4,533,074
[45] Date of Patent: Aug. 6, 1985

[54] ANTI-BACKLASH FORMS FEED MECHANISM

[75] Inventor: Ronald R. van Thiel, Fremont, Calif.

[73] Assignee: Xerox Corporation, Stamford, Conn.

[21] Appl. No.: 565,483

[22] Filed: Dec. 23, 1983

[51] Int. Cl.³ .................. B65H 17/40; F16D 1/08
[52] U.S. Cl. ........................ 226/74; 403/261; 403/383
[58] Field of Search .............. 226/74, 75, 76, 79; 464/162, 182; 403/383, 350, 373, 261, 240, 326, 327, 328, 329, 330, 397; 474/902, 903; 267/163, 164; 400/616.1, 616.2, 616.3

[56] References Cited

U.S. PATENT DOCUMENTS

| | | | |
|---|---|---|---|
| 1,262,924 | 4/1918 | Crippen | 403/261 |
| 3,477,626 | 11/1969 | Hilpert | 226/74 X |
| 3,922,928 | 12/1975 | Kester | 464/162 X |
| 3,930,601 | 1/1976 | Masuda | 226/74 |
| 4,025,210 | 5/1977 | Johnson | 403/383 X |
| 4,106,311 | 8/1978 | Euler | 464/162 X |
| 4,197,969 | 4/1980 | Sasaki | 226/79 |
| 4,227,821 | 10/1980 | Plaza et al. | 226/76 X |
| 4,454,975 | 6/1984 | Rosenberg | 226/74 |

Primary Examiner—Harvey C. Hornsby
Assistant Examiner—Scott J. Haugland
Attorney, Agent, or Firm—Serge Abend

[57] ABSTRACT

An improved forms feed mechanism for bidirectionally moving an edge perforated record material, while maintaining the same relative position between the drive shaft and the driven member in both directions of drive shaft rotation, so that printing may be effected in both directions. This may be accomplished by biasing the driving and driven surfaces toward one another.

1 Claim, 6 Drawing Figures

ANTI-BACKLASH FORMS FEED MECHANISM

This invention relates to an improved forms feed mechanism and, more particularly, to a forms feed tractor for bidirectionally moving an edge perforated record material, while maintaining print line accuracy.

When feeding marginally perforated record material, such as computer forms paper, it is generally necessary to use a feeding apparatus different than the conventional platen and pressure roller arrangement. The two most common feeding mechanisms for this type of record material are the pinfed apparatus, exemplified by the disclosure of U.S. Pat. No. 4,033,493 (Levinson) and the tractor feed apparatus, exemplified by U.S. Pat. No. 4,042,091 (Levinson et al) both assigned to the same assignee as the present application. In each, the record material is introduced into the printer and the appropriate, left and right, pin bearing feeding devices are laterally adjusted to be aligned with the perforations. For ease of lateral adjustment the feeding devices are slideably mounted upon a common drive shaft which extends parallel to the printer platen. It should be apparent, that in order to enable sliding movement, the fit between the drive shaft and the feeding devices should be sufficiently loose.

While these feeding mechanisms are highly satisfactory for advancing the record material in one direction, they are substantially less satisfactory in maintaining print line registration when bidirectional feeding is required. When feeding in only one direction, the driving shaft will always be in the same position relative to the driven portion of the feeding device. However, when feeding bidirectionally, the loose fit between the driving shaft and the driven portion of the feeding device will create objectionable backlash.

Recently, the proliferation of the computers products, having graphics display capabilities, has driven the output requirements of computer output printers to have similar capabilities. This means that the printer must be able to drive the record material both in a forward and in a backward direction in order to generate the graphical diaplay. Of course, high quality output is dependent upon the ability of the record material feeding mechanism to insure that the line registration is within exacting tolerances. The accuracy of these feeding mechanisms is limited by the amount of backlash throughout the feed drive train and, in particular, in the feeding device itself.

One approach to printing graphical or pictorial information, utilizing the known feeding devices, has been to always drive the feeding mechanism in the same direction prior to printing. Thus, the driving shaft will always be in the same position relative to the driven portion of the feeding device. In other words, if it is necessary to back-up the record material, it is reversely driven further than the desired print line and then again driven in the same direction, until the print line is reached. This double reverse driving negates backlash by always biasing the feeding mechanism in the same direction. A major disadvantage of this approach is its reduction in print speed.

Therefore, it is the primary object of the present invention to provide an improved feeding mechanism including an anti-backlash device, for maintaining same position between the drive shaft and the driven element in both directions of drive shaft rotation so that printing may be effected in both directions.

The present invention may be carried out, in one form, by providing a record material feeding mechanism for accurately moving record material having perforations along its side edges past a printing station in forward and reverse directions. The feeding mechanism comprises a drive shaft whose cross-sectional configuration includes contiguous driving surfaces intersecting at a predetermined angle and a rotatable driven member having a cross-sectional opening including contiguous driven surfaces intersecting at substantially the same angle. The cross-section of the drive shaft is slightly smaller than the cross-sectional opening of the driven member, for allowing sliding clearance therebetween. A biasing element mounted upon the driven member urges the contiguous driving surfaces against the contiguous driven surfaces. Thus, there will be no angular shift, between the drive shaft and the driven member, accompanying changes in the direction of rotation of the drive shaft.

This invention may be carried out, in one form, in accordance with the following detailed description and with reference to the drawings, in which.

Figure 1:
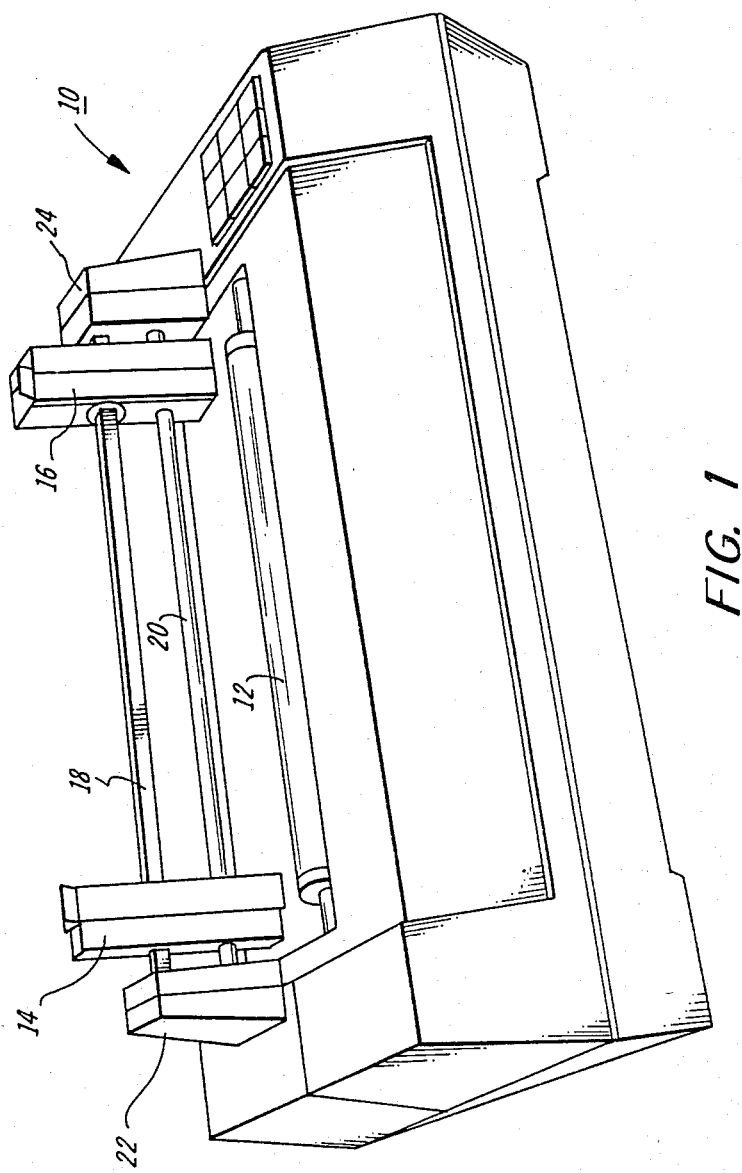
FIG. 1 is a perspective view of a printer incorporating a forms feed tractor drive.

Turning now to the drawings, there is illustrated, in FIG. 1 a printer 10 including a platen 12 against which a typical, continuous web of forms feed record material (not shown) may urged for being printed upon. In the mode shown, the printer will feed the computer forms record material, having rows of perforations along its marginal edges, past the platen in a well known manner. The drive arrangement includes a pair of forms feed tractor heads 14 and 16, each positionable adjacent the record material along the paths of the perforations.

The tractors are mounted upon a pair of parallel shafts 18 and 20 which, in turn, are parallel to the axis of the platen. Shaft 18 is the drive shaft which is connected to be driven, through a suitable gear train, chain drive or other conventional drive, from a suitable power source, such as an electric motor. The drive train may be housed within one of the upstanding enclosures 22 or 24. Drive shaft 18 is of square cross-section whereas shaft 20 is a guide shaft and is of circular cross section. The tractor head 14 and 16 are laterally positionable with respect to each other along the shafts. Accordingly, by moving them either closer to one another or further from one another, record material of various widths may be accommodated.

Figure 2:
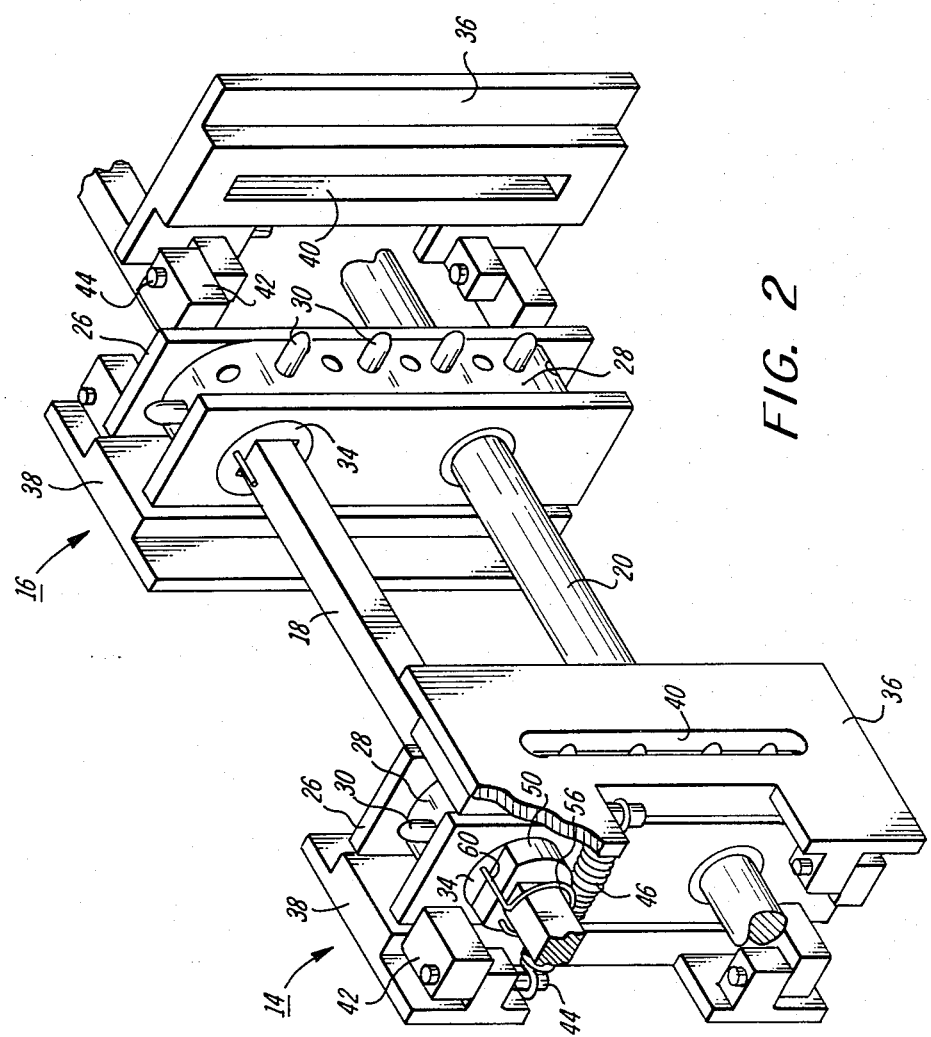
FIG. 2 is a perspective view of the improved anti-backlash device of the present invention, in a forms feed tractor drive.

Details of the construction of the forms feed tractors may be seen in FIG. 2. It can be seen that the tractor heads 14 and 16 are substantially the same, being mirror images of one another. Each includes a central body, or frame, 26 which supports and defines the path of movement for a flexible endless belt 28 made of non-stretchable, dimensionally stable, film material. A plurality of driving pin elements 30 are affixed to and surround each belt, extending outwardly from the driving surface thereof. These pins have a cross-sectional shape and are spaced from one another, along the belt, in such a manner as to mate with the marginal perforations in the record material.

Figure 3:
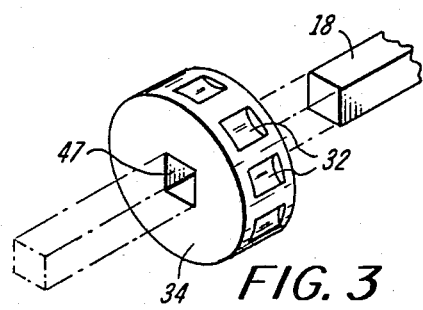
FIG. 3 is a partial exploded perspective view showing the known prior art drive connection to the tractor pulley.
Figure 5:
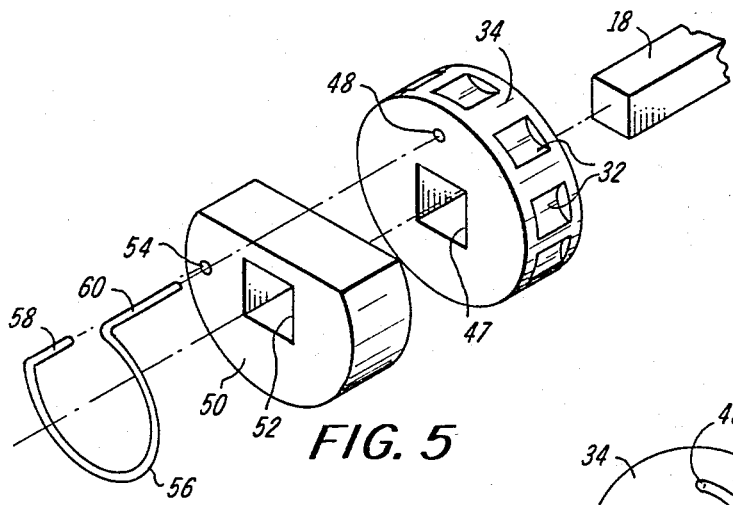
FIG. 5 is a partial exploded view showing the improved anti-backlash hub.

Standard driving elements (not shown) extend inwardly from the driven surface of the belt and are received by mating indentations 32 formed in the surface of sprocket 34 (see FIGS. 3 and 5). Pivotable guide plates 36 and 38 sandwich the record material between themselves and the central body 26, maintaining the record material against the feeding surface of the belts 28. Each guide plate has an elongated slot 40 therein through which the driving pins project. Suitable shoulders 42, on the central body, slightly space the guide plates therefrom for allowing the record medium sufficient clearance to move freely when the plates have been pivoted about pivot pins 44, into their closed, capturing position. Over-center spring 46 biases the guide plate into the closed position and also holds it in its open position for loading the record material.

Figure 4:
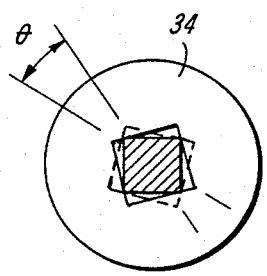
FIG. 4 is a schematic view showing the backlash in the FIG. 3 arrangement.

As illustrated in FIG. 3, the drive shaft 18 passes through a square opening 47 in drive sprocket 34. In order to allow the tractor head to slide freely along the shaft, as required for laterally adjusting the position of the heads for material of a different width, there must be sufficient clearance between these two members. However, this very clearance is the primary cause of unacceptable backlash, as is illustrated schematically in FIG. 4. The symbol $\theta$ represents the angle subtended between the two extreme positions of the freedom of angular movement between the sprocket and the drive shaft 18. The shaft is shown in cross-section while the sprocket is shown in its extreme counterclockwise position of rotation in solid lines and in its extreme clockwise position of rotation in dotted lines. Thus, it will be apparent that when bidirectional feeding is undertaken, the drive shaft will be rotated through the angle $\theta$ with no motion imparted to the sprocket 34. It is this angular clearance which must be eliminated in order to provide bidirectional feed accuracy.

Figure 6:
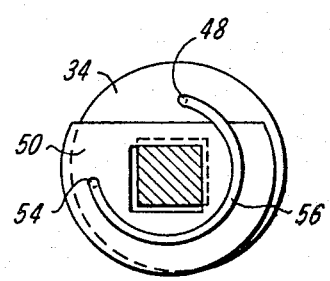
FIG. 6 is a front elevation view showing the anti-backlash hub of FIG. 5, in operation.

The impovement of the present invention is shown in detail in FIGS. 5 and 6. The improved sprocket 34 is provided with a hole 48 at about the 12 o'clock position, extending parallel to the axis of the sprocket. It is mounted upon drive shaft 18, in the usual manner, and with the usual clearance. An anti-backlash hub 50, having a square central opening 52, is also mounted upon the drive shaft and is positioned adjacent the sprocket. Its clearance relative to the drive shaft is comparable to that of the sprocket 34, for sliding movement upon the shaft. The hub is in the form of a cylindrical disc with a chord removed therefrom, and a hole 54 at about the 9o'clock position, extending parallel to the axis of the hub. The chordal cut-out provides access to the hole 48 when the hub and sprocket are in contiguous position. A torsion spring 56 has an arcuate planar portion subtending an angle of about 290°, and two axially extending legs 58 and 60. In operative position, the spring 56 surrounds the drive shaft, the shorter leg 58 is located in hole 54, and the longer leg 60 is located in hole 48.

As illustrated in FIG. 6, the spring, which at rest subtended an angle of about 290°, is forced to subtend an angle of about 270° when its legs are placed in holes 48 and 54. The tensioned spring biases the sprocket and the hub apart, capturing the shaft squarely against the lower left corner of opening 47 and against the upper right corner of opening 52. The contiguous driving surfaces mate with contiguous driven surfaces during both directions of drive shaft rotation. Since the spring 56 will hold the sprocket against the drive shaft regardless of the direction of rotation of the drive shaft, backlash has been eliminated and a positive and accurate drive is effected. This spring torque must only be sufficient to overcome the driving load, so that it may act upon the hub and the sprocket in the desired manner during driving.

Although the above description and the drawings have described and illustrated the anti-backlash device, of the present invention, in the context of a forms feed tractor, it may be readily incorporated into the known pinfeed drives, insofar as the problem is encountered therein. It should be noted that the beneficial results of the present invention have been accomplished by the addition of two extremely low cost parts and a minimal incremental increase in assembly cost. Backlash has been eliminated and feeding accuracy is maintained in both directions of drive.

It should be understood that the present disclosure has been made only by way of example and that changes in details of construction and the combination and arrangement of parts may be resorted to without departing from the true spirit and the scope of the invention as hereinafter claimed.

What is claimed is:

1. An anti-backlash feeding mechanism for moving record material having perforations along its side edges, in forward and reverse directions, past a printing station, said feeding mechanism comprising:

rotatable driving means having a cross-sectional configuration of a given shape and including contiguous driving surfaces intersecting at a given angle, rotatable driven means having an opening therethrough with a cross-sectional configuration of substanially the same given shape and being slightly larger than said driving means cross-sectional configuration, for receiving said driving means in sliding engagement, and including contiguous driven surfaces intersecting at substantially the same predetermined angle, and biasing means for urging said contiguous driving surfaces and said contiguous driven surfaces together, including a hub located adjacent said driven means, said hub having a cross-sectional opening substantially identical to said driven means cross-sectional opening and encircling said drive means, and a torsion spring encircling said drive means, said torsion spring comprising a planar arcuate portion circumscribing an arc of less than 360° and a pair of anchoring ends extending, in the same direction, substantially normally to said planar portion, one of said ends anchored in an opening in said driven means and the opposite end anchored in an opening in said hub, for urging said driven means and said hub in opposite directions relative to and into contact with said drive means, said hub further including access means for allowing said one of said ends of said torsion spring to pass to and into said driven means, whereby said torsion spring urges said driven means and said hub toward opposite corners of said driving means.

* * * * *